United States Patent
Takayasu et al.

(10) Patent No.: US 7,089,156 B2
(45) Date of Patent: Aug. 8, 2006

(54) METHOD AND APPARATUS FOR DETERMINING THE PERFORMANCE OF DATA PROCESSING DEVICES WITH UNSYNCHRONIZED CLOCKS

(75) Inventors: Hiroshi Takayasu, Tokyo-to (JP); Kenichi Amemiya, Yamanashi-ken (JP); Gonzalo Martinez Sanchez, Madrid (ES); Angel Abello de la Puente, Madrid (ES); Elisa Martin Garijo, Pozuelo (ES)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 09/918,986

(22) Filed: Jul. 31, 2001

(65) Prior Publication Data

US 2002/0022945 A1 Feb. 21, 2002

(30) Foreign Application Priority Data

Aug. 9, 2000 (JP) .............................. 2000-240671

(51) Int. Cl.
*G06F 11/30* (2006.01)

(52) U.S. Cl. ...................................... 702/186

(58) Field of Classification Search ................. 702/186
See application file for complete search history.

(56) References Cited

U.S. PATENT DOCUMENTS

| | | | | |
|---|---|---|---|---|
| 4,591,730 A | * | 5/1986 | Pennoni | 370/321 |
| 5,233,545 A | * | 8/1993 | Ho et al. | 377/13 |
| 6,405,236 B1 | * | 6/2002 | Nieratschker | 709/200 |

* cited by examiner

*Primary Examiner*—Bryan Bui
*Assistant Examiner*—Tung S. Lau
(74) *Attorney, Agent, or Firm*—Scully, Scott, Murphy & Presser; David L. Adour, Esq.

(57) ABSTRACT

Method and apparatus to enable measurement of response times, for example at one-second resolution or better, in a system where a starting location and ending location of processing are different. A timing data that signals a start of data processing is entered into a logging device and recorded in a system log file with a time stamp placed according to a system clock of the logging device. Output data from a CIS interface or TV interface that signals the end of processing is sent to the logging device and recorded in the system log file 20 with a time stamp placed according to the system clock of the logging device. The processing time is calculated with reference to the time stamps in the log data in the system log file associated with the processing.

17 Claims, 10 Drawing Sheets

```
F 13944.738 0005141844429LG04REP 0514184429REPLG04 n0001 STSIM   StSim R COM=1 Len= 20 Data.  2R ?< 220702 D
F 13944.783 0005141844429LG04REP 0514184429REPLG04 n0001 STSIM   StSim R COM=1 Len= 21 Data.        —         
F 13944.932 0005141844429LG04REP 0514184429REPLG04 n0001 STSIM   StSim R COM=1 Len= 20 Data.  2R ?< 220702 D
```

FIG. 6

[ 582: ]JF 13972.802 0005141844457REPLG04REP 0514184457LG04REP 0514184457REPLG04 n0001 STSIM StSim StSim R COM=1 Len= 21
Data: 4 1  30.00
        ↑    ↑
        60   61

[ 583: 582]JF 13972.896 0005141844457C02NTP 0514184457C02NTP 0514184458  AQUP1C02 TVINT DRIVEROUT Len= 40
EU=SWW041302 ID=200 Data: ST¥4¥1000136¥1¥  30.00¥50¥¥¥1¥¥  0.46
                                   ↑           ↑
                                   62          63

[ 585: 582]JF 13973.266 0005141844458D04NTP 0514184458D04NTP 0514184458  AQUP1D04 CISIF MQPUT  Len= 157
MSF:Size=44 Type=1 S-ID=SWW041302100002 LR=0 NumFlds=1 Data:<NC01:R04C10L008A08 D=  30.00>
                                                                    ↑                ↑
                                                                    64               65

METHOD AND APPARATUS FOR DETERMINING THE PERFORMANCE OF DATA PROCESSING DEVICES WITH UNSYNCHRONIZED CLOCKS

FIELD OF THE INVENTION

The present invention relates to a method for measuring the performance of a data processing system. More particularly, it relates to a technique that can be applied effectively to the measurement of system performance when data processing in one task is started by one device or system and ended by another device or system.

BACKGROUND

Normally, when a system integration service or system-outsourcing service is provided, service level agreements are reached between service provider and client. Therefore, the achievement of service levels needs to be measured. To work out service levels concerning system response time, it is necessary to measure and evaluate response times in the system development and testing phases, and continue to measure and evaluate them after the system starts production runs. This requires an objective system for measuring response times.

In the case of Web application systems and client/server systems, the source location of a user request and the destination location of a response to the user are the same. In such cases, a system that generates requests and receives responses can measure the time interval between the generation of a request and approval of a response using its system clock.

Clearly, the above mentioned technique used when the source location of a request and the destination location of a response are the same cannot be applied to cases where the source location of a request and the destination location of a response are different.

If the source location of a request and the destination location of a response are different, the response time can be measured, for example, as follows by using synchronization with a server that provides standard time. Specifically, the system from which the request is issued and the system at which the response arrives access the server that provides standard time and synchronize their system clocks with the standard time. The time when the request was issued and the time when the response was received are stamped according to the system clocks of the respective systems. Later, these times are gathered at one location to calculate the response time.

The above mentioned technique for synchronizing system clocks using standard time does not pose a particular problem if the temporal accuracy required is within a few seconds. However, difficulties arise if a subsecond temporal accuracy is required. Synchronization techniques on the order of several hundred milliseconds have been established on the Internet, but overhead information is necessary for synchronization. In the case of systems that require fast response, this overhead cannot be ignored as a load. Also, it is difficult to synchronize system clocks properly. Particularly, large systems such as systems for Olympic games, which require fast response speeds (one second or less) and consist of a large number of devices have difficulty in synchronizing the devices properly.

An object of the present invention is to provide a technique for measuring response times, for example, at one second resolution or better when the starting location (start device) and ending location (end device) of processing are different.

SUMMARY

The present invention will be outlined below. Notification data of the start and end of processing are recorded by one logging device together with the time stamps of when the data (messages) were received. The time stamps attached to the messages are based on the system clock of the logging device. They represent the start time and end time of the processing. The processing time is calculated from the difference between the measured end time and start time. Since the start time and end time of processing are measured by one logging device (system clock), there is no need to synchronize system clocks. Besides, since the only system clock in the logging device is used, the calculated processing time does not depend on the system clocks of the start device and end device. This makes it possible to calculate accurate processing times.

The notification data of the start and end of processing are generated by the start device and end device and sent to the one logging device. The start of processing may also be generated by the logging device when input data is entered into the start device.

The notification data are sent to the logging device using TCP (Transmission Control Protocol) or UDP (User Datagram Protocol), where, TCP or UDP is used on IP (Internet Protocol). If Ethernet with a transfer speed of 10 Mbps is used, the notification data will reach the logging device with a network delay of a few milliseconds, which will not affect measurement accuracy on the order of several hundred milliseconds. In the case of UDP, higher accuracy can be achieved if ACK (connection acknowledgment function) and RETRY (data retransmission function) processes are eliminated in the protocol.

The notification data of the start and end of processing must be associated with each other in some way. Generally, data processing begins with entry of input data into the start device, performs predetermined processes on the input data, and ends at the end device. Consequently, the final data (output data) generally contains the content of the input data. Therefore, the input data is included in the start notification data and output data is included in the end notification data, and the start notification data and end notification data can be associated with each other by using predetermined keywords contained in the input data and output data.

Alternatively, if the start or end of processing can be identified by records in storage devices, changes in files stored in the storage devices may be monitored and included in the notification data. In this case, the start and end can be associated with each other by file name (directory name) and file size. Also, if the start and end of processing can be identified by messages generated by an API (Application Programming Interface) such as NETBIOS, these messages can be monitored and their contents can be included in the notification data. In this case, the start and end can be associated with each other by keywords contained in the messages.

DETAILED DESCRIPTION

A preferred embodiment of the present invention will be described in detail below with reference to the accompanying drawings. However, the present invention may be embodied in various different forms and should not be limited to the embodiment described herein. The same elements are given the same reference numerals throughout the embodiment described herein.

The embodiment will be described below in relation to a method and system. However, in addition to methods and systems, the present invention can be implemented as media containing programs that can be used on computers, as will be apparent to those skilled in the art. Therefore, the present invention can be implemented as hardware, software, or combinations of hardware and software. The media containing programs may be any computer-readable media such as hard disks, CD-ROMs, optical storage devices, or magnetic storage devices.

If the following embodiment uses computers as the devices described, it can use typical computers. The computer used by the embodiment comprises a central processing unit (CPU), main memory (RAM), nonvolatile storage (ROM), etc. and is connected to them via a bus. Besides, the bus may also be connected with a coprocessor, video accelerator, cache memory, input/output controller, etc. External memories, data input devices, display devices, communications controllers, etc. are connected to the bus via appropriate interfaces. Needless to say, the computer may be equipped with other hardware resources that are generally installed on a computer. A typical external memory is a hard disk unit, but a magneto-optical storage system, optical memory unit, and semiconductor memory such as a flash memory can also be used. The data input devices include an input device such as a keyboard and pointing device such as a mouse. The data input devices may also include a voice input unit as well as an imaging device such as a scanner. The display device may be a CRT, liquid crystal display, plasma display unit, etc. The computer system may be a personal computer, workstation, main frame computer, etc.

Figure 1:
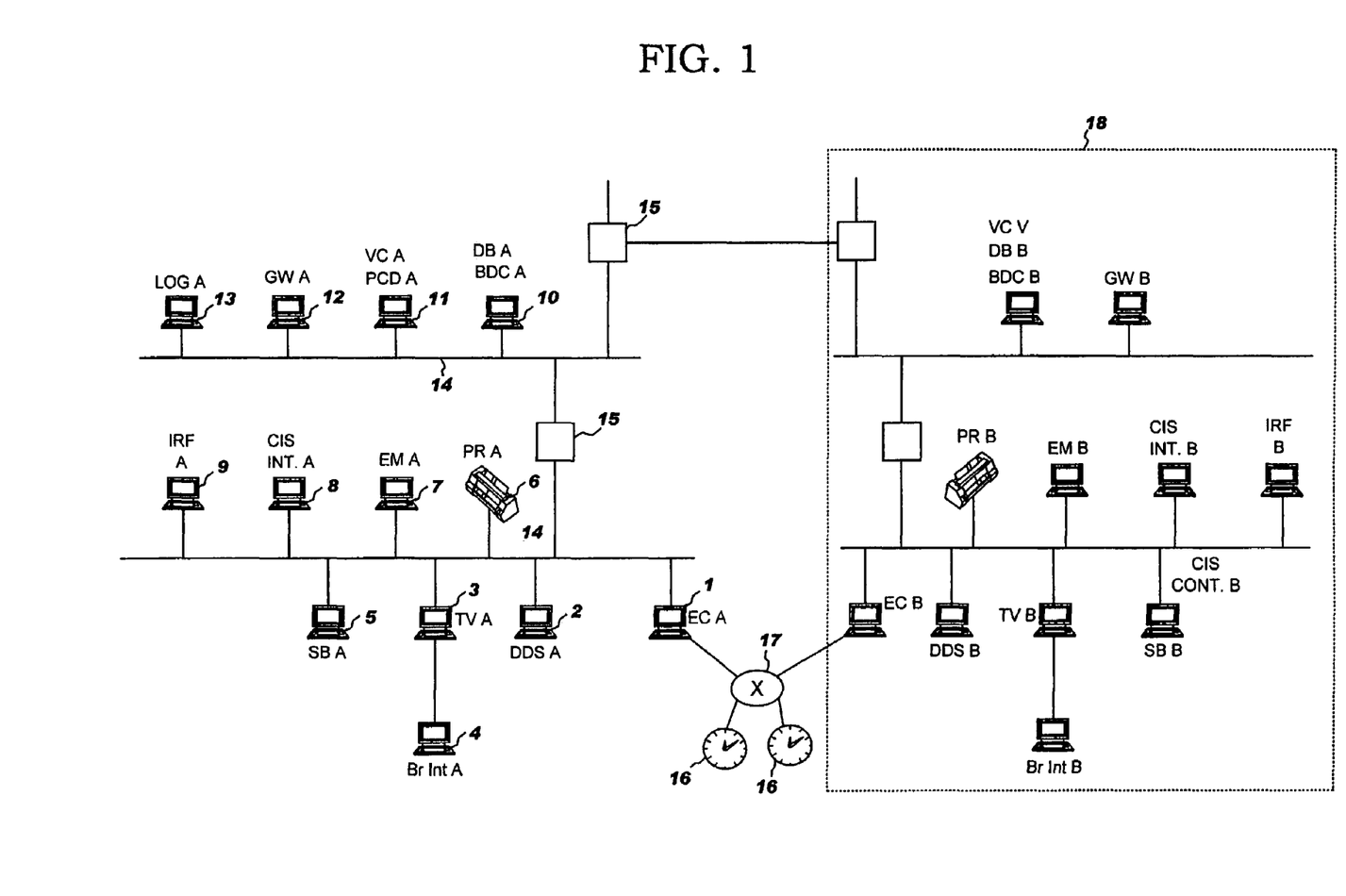
FIG. 1 is a block diagram showing an example of a data processing system according to the present invention.

FIG. 1 is a block diagram showing an example of a data processing systems according to the present invention. This embodiment will be described taking, as an example, data processing in Olympic games: processing of timing data, processing of TV images, and processing by a commentator-information system.

The system of this embodiment includes an event controller (EC) 1, data display system (DDS) 2, TV interface (TV) 3, broadcaster interface (BrInt) 4, scoreboard interface (SB) 5, printer (PR) 6, event manager (EM) 7, commentator information system interface (CISINT) 8, Internet result feed machine (IRF) 9, database server (DB) and backup domain control (BDC) 10, venue control (VC) and primary domain control (PDC) 11, gateway (GW) 12, and logging device 13. These devices are connected via a LAN 14 and router 15.

This system interoperates with another system 18 having a similar configuration. This redundancy of system configuration makes it possible to avoid delays in processing by operating the backup system immediately if part of the system fails. Redundancy has been increased because delays in processing are not permitted in situations, such as Olympic games, that draw global attention.

The event controller 1 has the capabilities to receive messages (time data) from a timing device 16 and calculate the standings of athletes, time differences between athletes, etc. based on the received messages. The results of the calculations are written into the database 10. The messages from the timing device are divided by a splitter 17. The event controller 1 controls the processes from the start to the end of an event, i.e., until all the athletes reach the goal.

The data display system 2 is connected with CATV ahead and has the capability to feed text information to CATV screens.

The TV interface 3 sends data to the broadcaster interface 4 through, for example, RS-232C. The broadcaster interface 4 blends the data with the TV images supplied by TV companies, and the resulting pictures are broadcast worldwide.

The scoreboard interface 5 has the capability to send data to scoreboards in stadiums through, for example, RS-232C.

The printer 6 is an item of equipment used to print out data (information) as hard copy.

The event manager 7 has the capability to update data in the database 10 according to data input by an operator. It manages the processing before an event starts and after the event ends.

The commentator information system interface 8 is connected with a commentator information system (CIS) controller ahead, and with a CIS workstation further ahead. The commentator information system interface 8 has the capability to transfer data to be displayed eventually on the CIS workstation. Sportscasters and commentators broadcast live from stadiums with reference to the display on the CIS workstation.

The Internet result feed machine 9 is connected with an MQ server ahead and is connected eventually to an Internet server which provides information publicly. The Internet result field machine 9 has the capability to transfer data to the Web servers to be presented publicly.

The database server and backup domain control 10 combine the functions of a database server and the functions of a backup domain control. Various information (standings, time differences, any world record or Olympic record, etc.) calculated by the EC is recorded in the database. The information entered by the EM is also recorded in the database. The backup domain control has the capability of controlling the backup system 18.

The venue control and primary domain control 11 control the entire system. They distribute the data (information) recorded in the database of the database server 10 to DDS, TV, SB, PR, CISINT, IRF, GW, etc. Particularly, they serve the important function of distributing data from the EC to TV and CISINT in real time during events.

The gateway 12 is connected to the MQ server and has the capability to feed non-real-time data. The data is distributed to an Olympic intranet service (INFO) server, Internet Web server, print distribution server, Olympic news distribution system for the press (WNPA), etc.

The logging device 13 is a system for logging the data needed to measure the performance of the present system. It will be described in detail later.

The system may contain more than one unit of each of the above devices (1 to 12). Also, functions of individual devices may be integrated into other systems. For example, the database server 10 may have the system logging function for performance measurement. However, as described below, the system logging function of the present invention references a single system clock. Thus, there can be only one system logging function.

Figure 2:
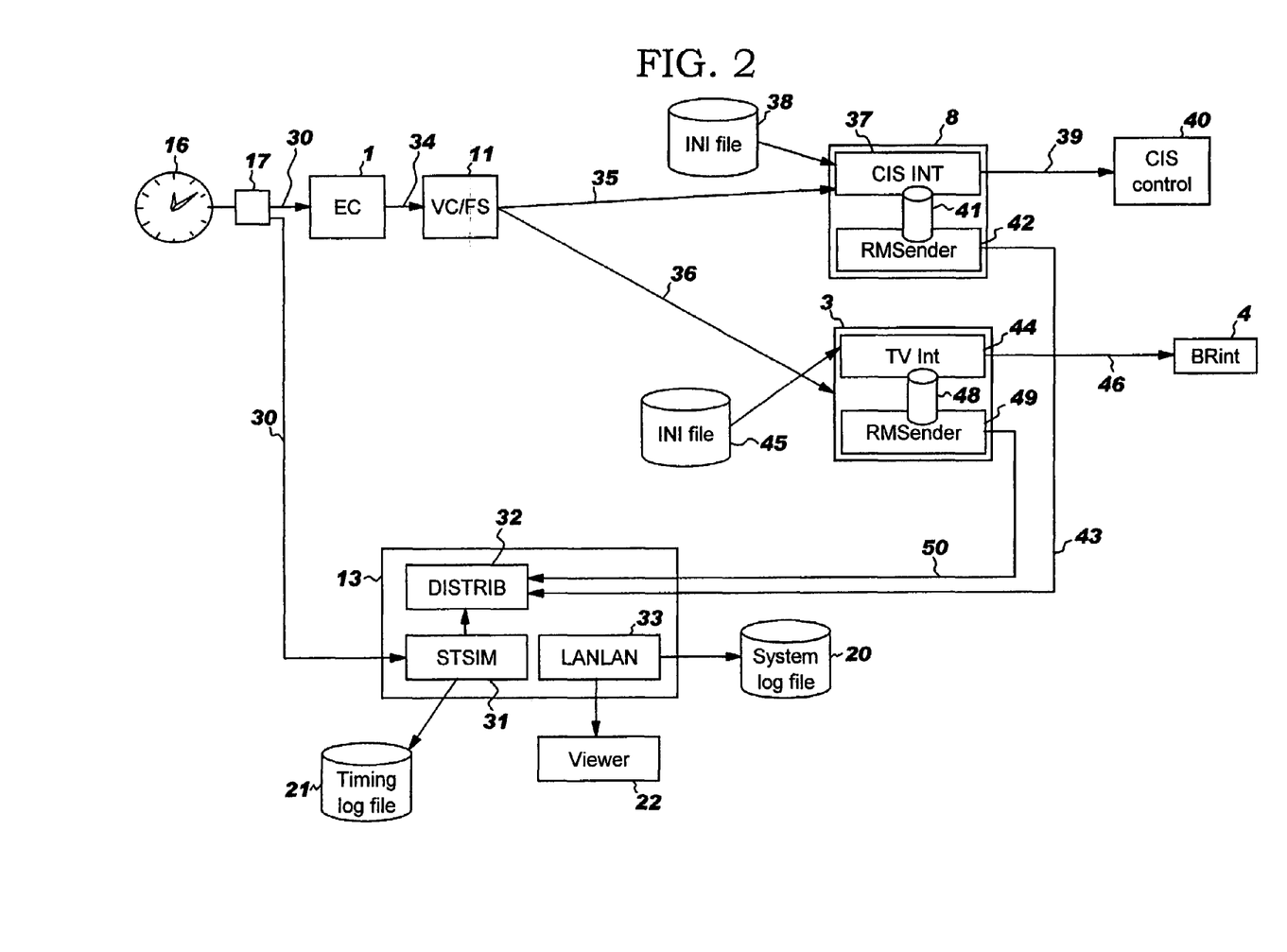
FIG. 2 is a block diagram showing part of the system.
Figure 3:
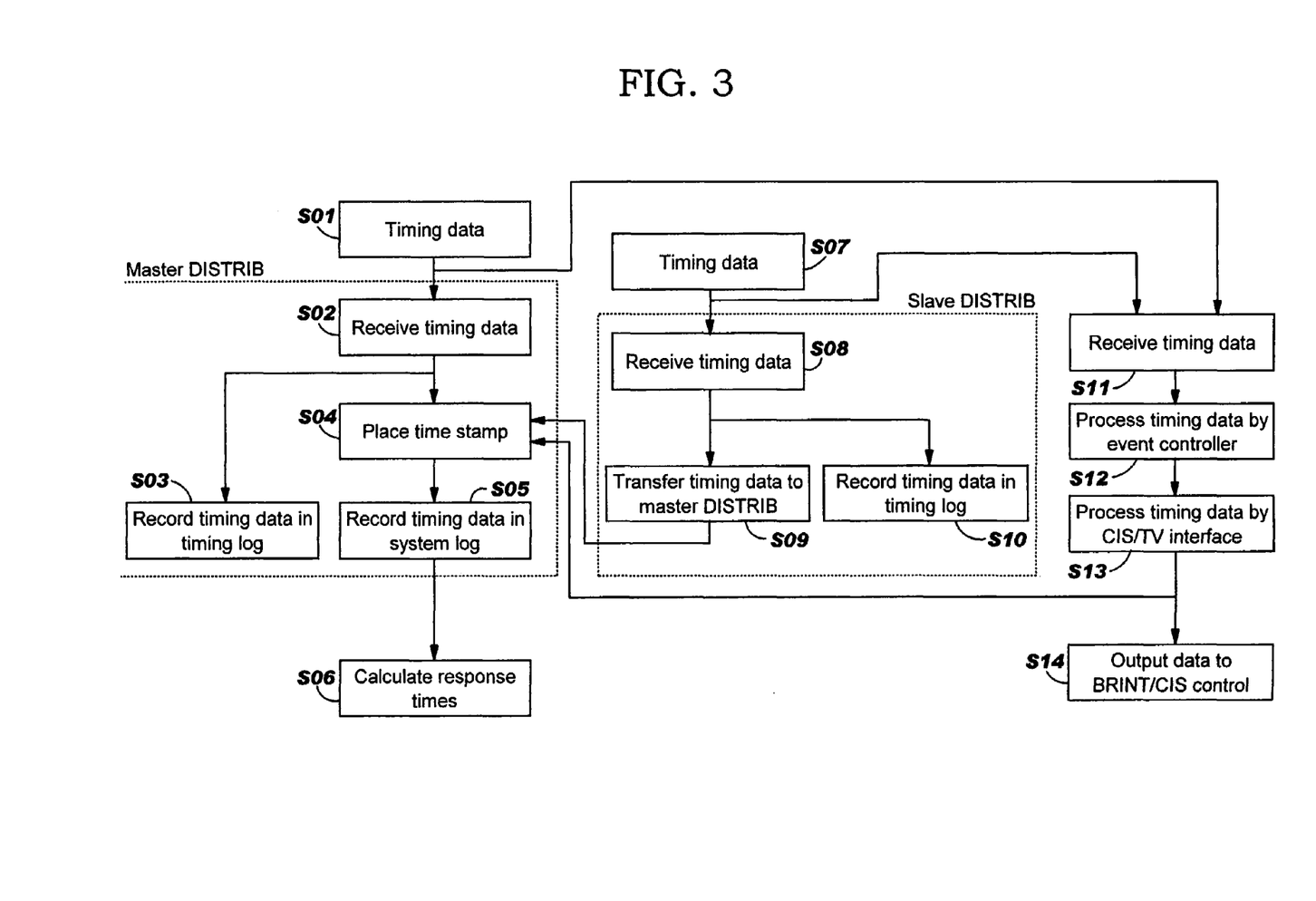
FIG. 3 is a flowchart showing a flow of performance measurement in the system.

FIG. 2 is a block diagram showing part of the system. FIG. 3 is a flowchart showing a flow of performance measurement in the system. As described above, the system is controlled by the event manager 7 before the start and after the end of an event and it is controlled by the event controller 1 during the event. The following description mainly concerns the processing during events (when the event controller 1 is in operation) that requires faster responses. However, the performance measurement according to the present invention works not only when the system is under the control of the event controller 1, but it also works anytime during the operation of the system.

Referring to FIGS. 2 and 3, the timing data 30 (S01) supplied by the timing device 16 is split by the splitter 17 into two parts. One of the parts is entered into the logging device 13 (S02) and the other is entered into the EC 1 (event controller) (S11). The timing data 30 may be supplied from a timing (clock) company in the format designated by the clock company. To connect the timing device 16 to the logging device 13 or EC 1, RS-232C is used, for example.

The timing data 30 entered into the logging device 13 is received by STSIM 31 (S02). STSIM 31 has the capability to receive timing data and record it in a timing log file 21 (S03) sequentially.

The timing data recorded in the timing log file 21 is read out when a replay is necessary due to a system failure or the like and supplied to the event controller (EC).

The input data received by STSIM 31 is transferred to DISTRIB 32. DISTRIB 32 has the capability to distribute input data to appropriate devices. As described later, even input data log devices (slave DISTRIB) that do not include the system log monitor (LANLAN 33) of this embodiment include DISTRIB. These input data log devices have the capability to transfer received input data to DISTRIB 32 of the logging device 13. Here discussion goes on the master device that comprises the system log monitor, LANLAN 33. Thus, the input data is sent from DISTRIB 32 to LANLAN 33.

LANLAN 33 has the capability to record the input data received from DISTRIB 32 in a system log file 20 (S05) by adding a time stamp to it (S04). The capability to add time stamps may also be implemented in DISTRIB 32. The clock used for the time-stamping is the system clock of the logging device 13. As described later, the same system clock is also used to time-stamp the data (process end message) sent from RMSender. In this way, since a single system clock is used, there is no need to synchronize multiple system clocks in the multiple systems that need performance measurement. The use of the single system clock readily allows high-accuracy performance measurements. The time-stamped input data thus recorded in the system log file 20 is used to identify the process start time of the system. As described later, the difference from the time stamp on the end message can be used to calculate the time required for processing. Incidentally, LANLAN 33 allows system logs to be displayed on a viewer 22.

On the other hand, the timing data 30 entered into the event controller (EC) 1 is processed by the EC 1 (S12). The data processing performed by the EC 1 includes, for example, calculations of athletes' standings and time differences as well as reference to world or Olympic records. The data 34 obtained from the calculations is sent to the venue control 11, from which it is transferred to CISINT 8 or TV 3 (35, 36). Although CISINT 8 or TV 3 is used as an example here, the description below similarly applies to other devices (DDS, SB, PR, IRF, and GW). However, when a PR is used, the PR should include a print server or it should be connected locally.

The transferred data 35 and 36 are processed by the CISInt (CIS interface) code 37 in CISINT 8 and by the TVInt (TV interface) code 44 (S13), respectively. This process makes the data compatible with the system connected ahead of each device. In this process, respective initialization files (INI files 38 and 45) are referenced. The data 39 processed by the CISInt code 37 is sent to the CIS control 40 (Sl4) and used by the commentator information system. The data 46 processed by the TVInt code 44 is sent to BRINT 4 (S14) and used by TV companies.

The data 39 and 46 are sent to systems other than the system of this embodiment. For the system of this embodiment, they are result data which indicate the end of a sequence of processes triggered by the entry of the timing data 30. Therefore, measuring the performance of the system of this embodiment is simply a matter of measuring the time from the entry of the timing data 30 to the delivery of the data 39 or data 46. The time the timing data 30 was entered is recorded in the system log file 20, as described above. Thus, the end time of processing (the time the data 39 or 46 was sent out) is measured as follows.

The CISInt code 37 sends the data 39 to the CIS control 40. It also sends the data 39 to RMSender 42 via an NT pipe 41. The TVInt code 44 sends the data 46 to BRINT 4. It also sends the data 46 to RMSender 49 via an NT pipe 48.

RMSender 42 and 49 send the received data 39 and 46 (result data) to DISTRIB 32 via TCP or UDP 43 and 50. DISTRIB 32 sends the received data 39 and 46 to LANLAN 33 as is the case with the timing data 30. The data 39 and 46 are time-stamped (S04) and recorded in the system log file 20.

The time-stamped data 39 or 46 has the function of identifying the end time of the sequence of processes. Strictly speaking, the process end time, which represents the time when the data 39 or 46 is sent out to CIS control 40 or BRINT 4 or the like, differs from the time the data 39 or 46 is received by DISTRIB 32. According to this embodiment, however, RMSender 42/49 and DISTRIB 32 are connected via TCP or UDP 43/50 and transfer delays are only on the order of several milliseconds even if Ethernet with a low data F transfer rate of 10 Mbps is used. Since the required accuracy for performance measurement according to this embodiment is on the order of 100 milliseconds, delays in the data transfer from RMSender 42/49 to DISTRIB 32 are negligible.

The data 39 and 46 are time-stamped according to the system clock in the logging device 13, which is the same system clock that is used for time-stamping the timing data 30. Since the same clock is used to measure the start and end of processing, there is no need to synchronize system clocks.

Also, the use of the single system clock readily allows high-accuracy performance measurements. Regarding the method for calculating the processing time from the difference between the time-stamped data 39/46 (process end data) and time-stamped timing data (process start data), description will be given later.

In this way, the data that identifies a process start time and the data that identifies a process end time are recorded sequentially in the system log file 20.

Although only one timing device 16 is used in the above example, there may be more than one timing device 16. Multiple timing devices may be connected in parallel to the splitter 17 so that timing data will be entered into the single splitter 17 from the multiple timing devices. However, when timing data are entered into the single splitter 17 from the multiple timing devices, the splitter 17 must be equipped with intelligent functions such as a termination detection function.

Figure 4:
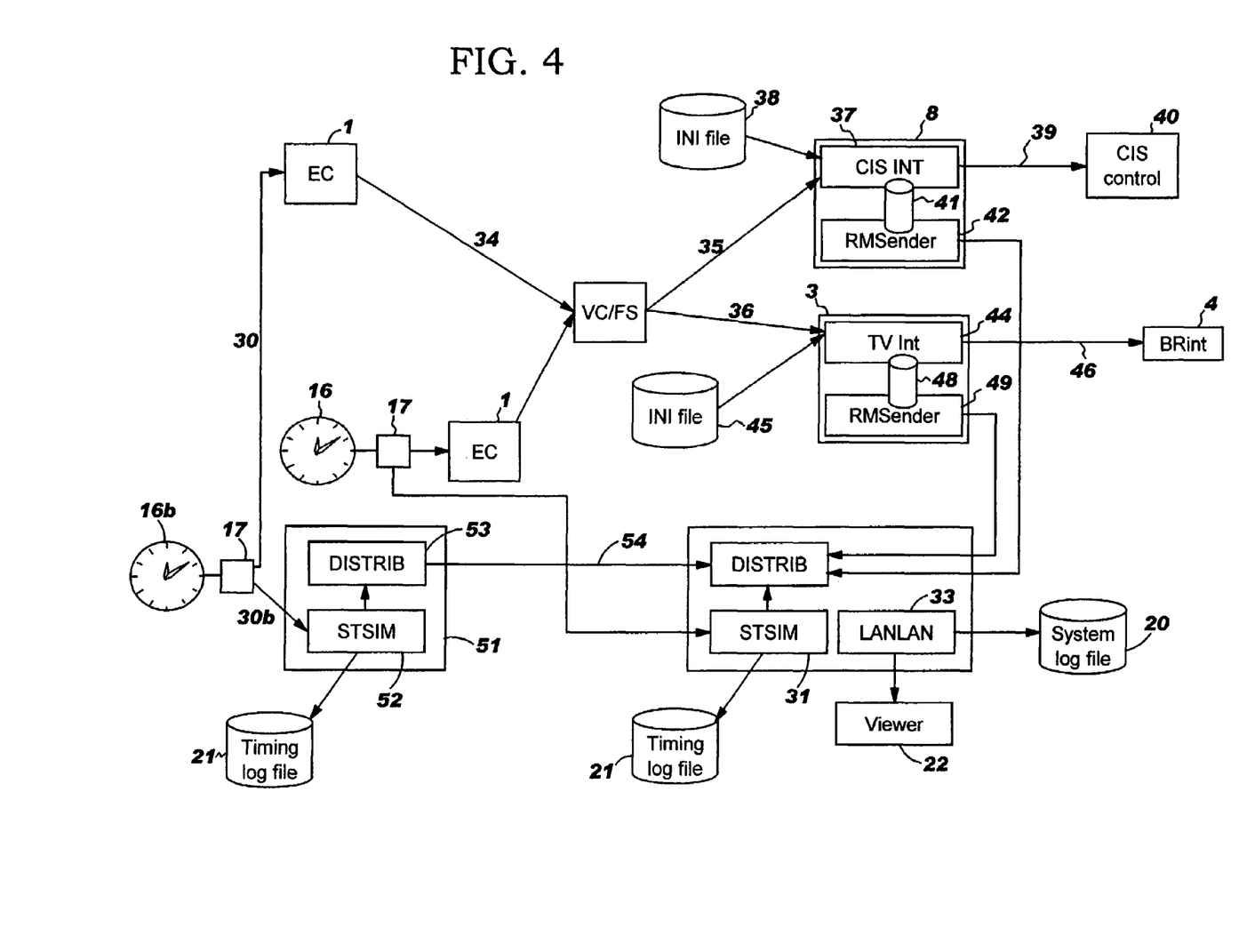
FIG. 4 is another block diagram showing part of the system.

As shown in FIG. 4, multiple timing devices 16 and 16b may be connected to the logging device 13 and another input data log system 51 via respective splitters 17. The input data log system 51 comprises STSIM 52 and DISTRIB 53, which have the same function as the above mentioned STSIM 31 and DISTRIB 32. The timing data 30b (S07) entered (S08) into STSIM 52 from the timing device 16b via the splitter 17 are recorded sequentially in the timing log file 21 (S10) as is the case with the logging device 13. Then the timing data 30b are transferred from STSIM 52 to DISTRIB 53, which in turn transfers the timing data 30b to DISTRIB 32 of the logging device 13 (S09). The timing data 30b received by DISTRIB 32 is processed in the same manner as described above.

The transmission of the timing data 30b from DISTRIB 53 is carried out via TCP or UDP 54. TCP or UDP 54 supports transfer rates of at least about 10 Mbps and network delays are on the order of several milliseconds as described above. The start point of processing triggered by the entry of the timing data 30b essentially is the time when the data is entered in STSIM 52, but since network delays are negligible, the time when a time stamp is added by the system clock in the logging device 13 in DISTRIB 32 or LANLAN 33 can be treated as the start point of processing. In other words, regardless of whether the timing data is entered into STSIM 31 of the logging device 13 directly or via the other input log system 51, if DISTRIBs are connected with each other through an IP connection on a network capable of high transfer rates, such as a TCP or UDP network, a single system clock in the logging device 13 can be used for time-stamping in order to identify the start time of processing. Description about that part of FIG. 4 which overlap with FIG. 2 has been omitted.

Figure 5:
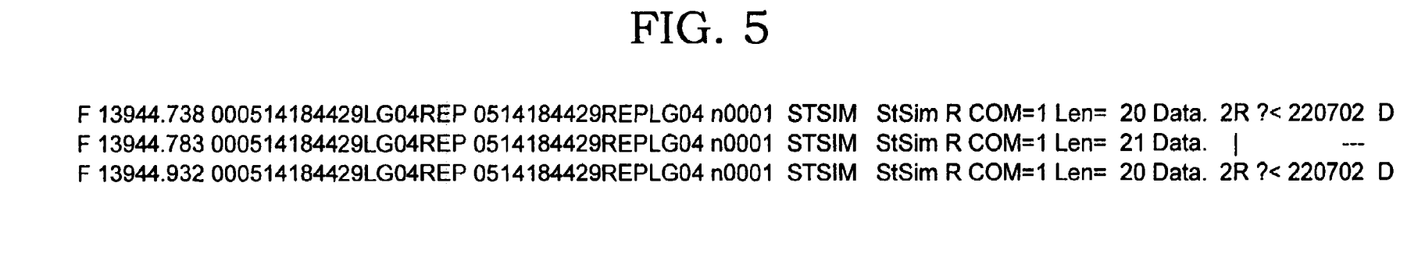
FIG. 5 is a chart showing an example of the data recorded in a system log file.

FIG. 5 is a chart showing an example of the data recorded in the system log file 20. One line corresponds to one dataset. On each line, the fixed-point number preceded by the symbol "F" and having three decimal places—for example, "13944.783" on the first line—is the time stamp. The unit is the second. The time stamp represents the time since the system clock of the logging device 13 starts counting. The characters "STSIM," "TVINT," "CISIF" contained in the data represent the device which sent the given data. The data containing "STSIM" identifies the start time of some process and the data containing "TVINT" and "CISIF" identifies the end time of some process.

Figure 6:
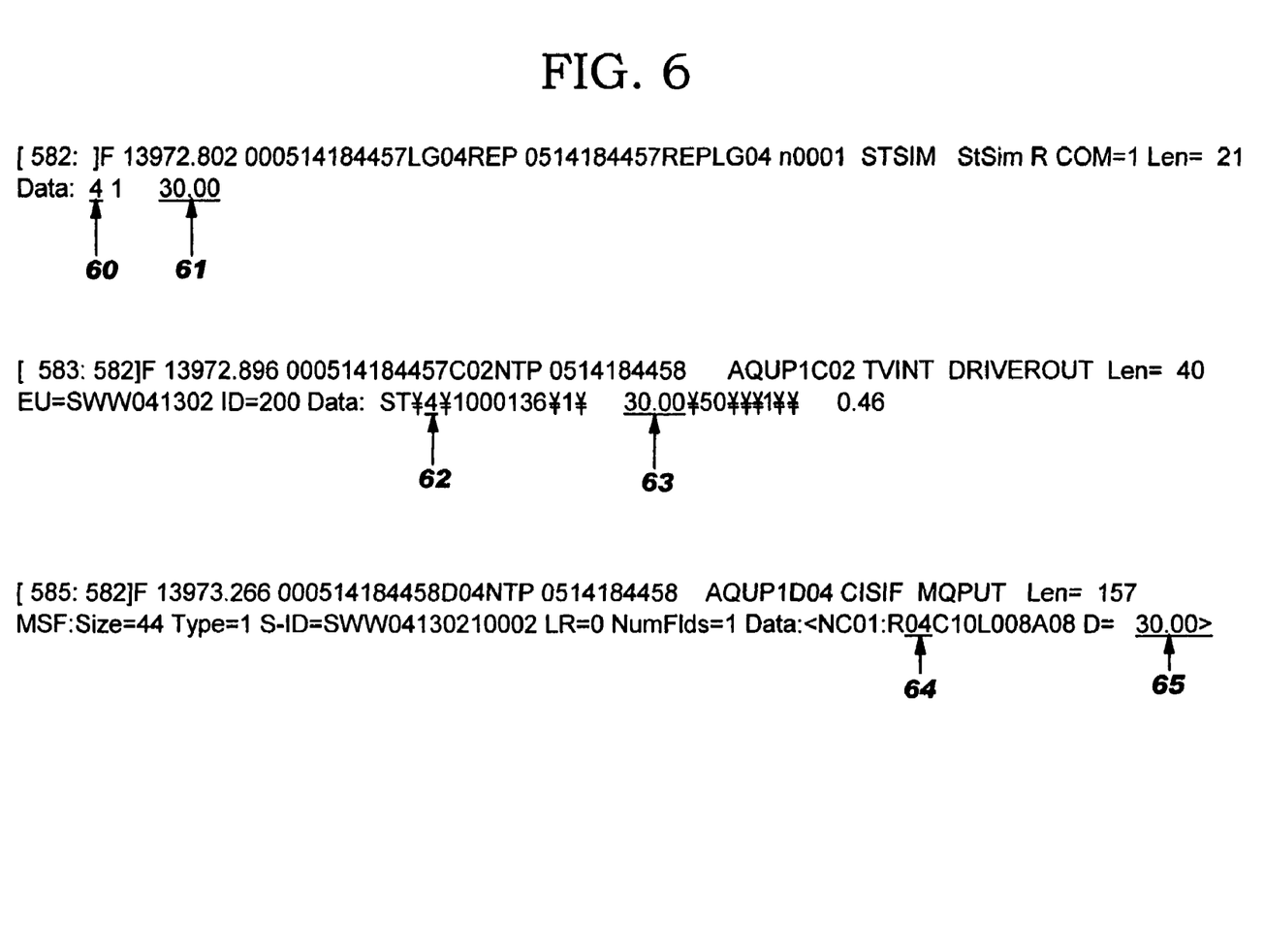
FIG. 6 is a chart illustrating the relationship among data recorded in the system log file.

The data recorded in the system log file 20 can be associated with each other as follows, i.e., the data that represent the start and end of a sequence of processes can be extracted as follows. FIG. 6 is a chart illustrating the relationship among data recorded in the system log file 20.

In FIG. 6, the data in the top row is data received by STSIM and identifies the start time of processing. The data illustrated here are timing data in a swimming event and contain the lane number (fourth lane in the case of the top row of FIG. 6) of an athlete, which is indicated by arrow 60. The halfway time (30.00 sec in the case of the top row of FIG. 6) of the athlete of this lane number is indicated by arrow 61. The end time data that corresponds to this start time data is searched for.

Since the data shown in the middle row of FIG. 6 contain characters "TVINT," it can be seen that they identify the end time of the sequence of processes up to TVINT 44. The data in the middle row contain the lane number (arrow 62) and halfway time (arrow 63) of the athlete. Specifically, the value of these data are "4" and "30.00," respectively, which match the STSIM data in the top row. Thus, the data shown in the top row can be associated with data shown in FIG. 5. It can be seen that the generation of a TV image (generation of the necessary data compatible with BRINT 4) triggered by the entry of the data shown in the top row took 0.094 second (=13972.896−13972.802). The calculations of processing times (response times) are carried out by a calculation system 71 described later.

Similarly, the data shown in the top row can also be associated with the CISIF data shown in the bottom row. The data in the bottom row contain a lane number (indicated by arrow 64) and halfway time (indicated by arrow 65). Their values are "4" and "30.00," respectively, as is the case with the data in the middle row, and thus can be associated with the data shown in the top row. Therefore, it can be seen from the data in the top row and data in the bottom row that it took 0.564 second (=13973.366−13972.802) to generate the necessary data to be sent to the CIS (commentator information system) controller.

Figure 7:
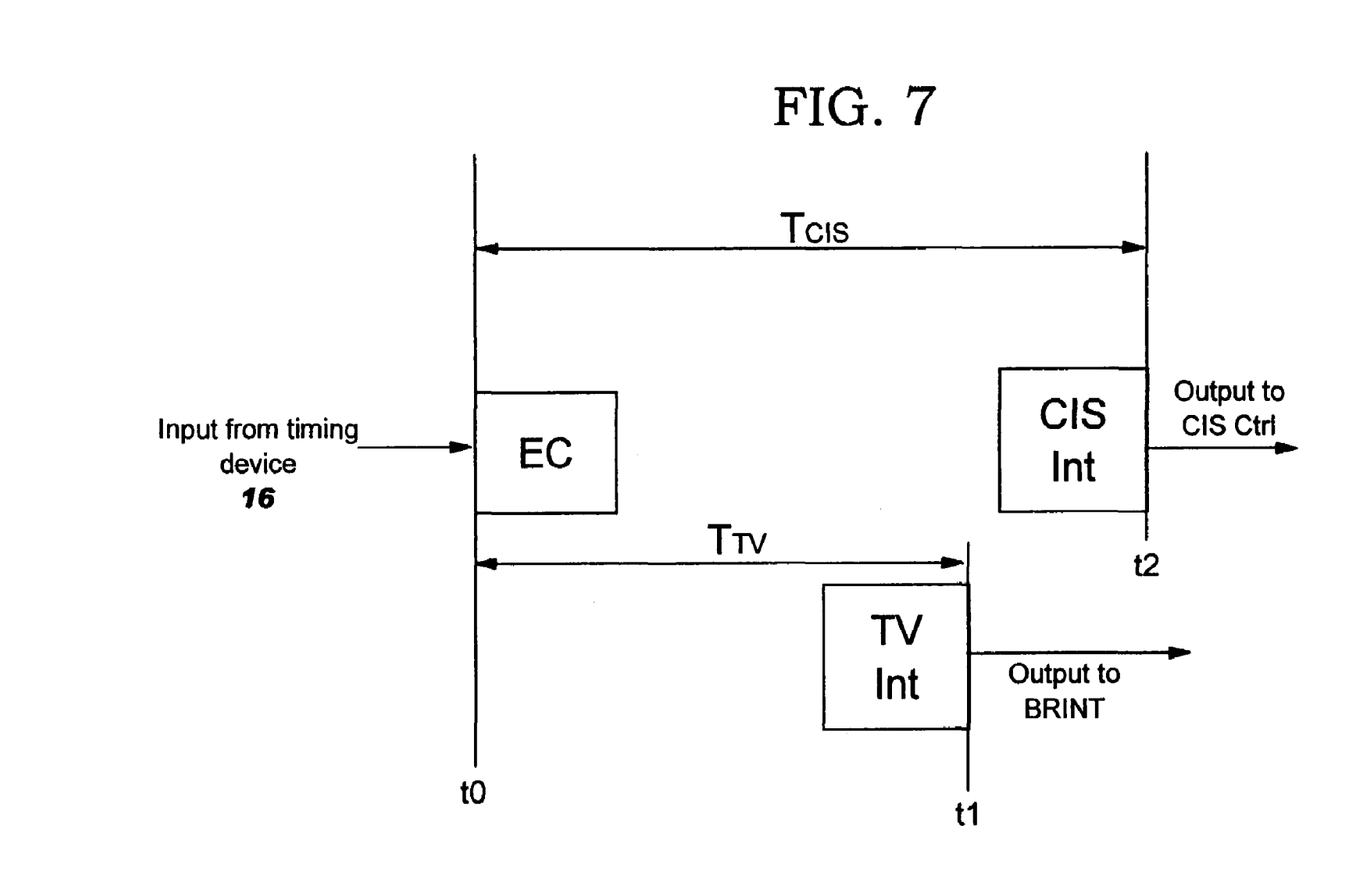
FIG. 7 is a diagram showing the processing times calculated.

FIG. 7 is a diagram showing the processing times calculated. At time t0, the timing data from the timing device 16 is entered. In FIG. 6, this time can be identified by the data in the top row. Next, event controller (EC) process is performed. Then the CIS interface (CISInt) process is performed and the TV interface (TVInt) process is carried out concurrently. When the TVInt process is finished (t1), data is output to BRINT and output data is sent to the logging device 13 via RMSender at the same time. In FIG. 6, t1 can be identified by the data in the middle row. When the CISInt process is finished (t2), data is output to the CIS controller and output data is sent to the logging device 13 via RMSender at the same time. In FIG. 6, t2 can be identified by the data in the bottom row. The time Tcis from the start of the processing to the end of the CISInt process and the time Ttv from the start of the processing to the end of the TVInt process are calculated by using the data t0 to t2. Tcis and Ttv represent the system performance related to the respective processes.

Figure 8:
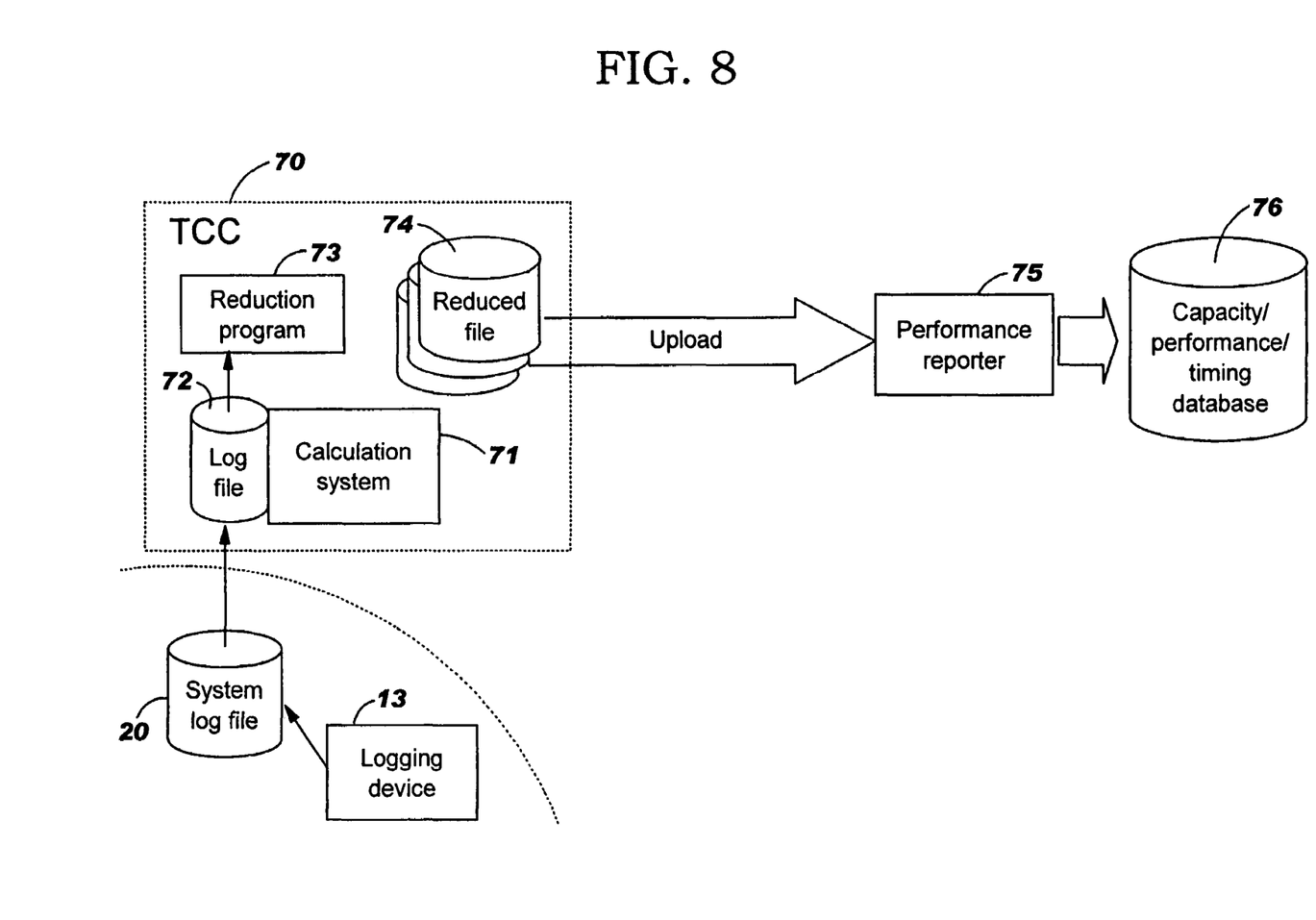
FIG. 8 is a diagram showing an example system for processing system performance reports.

FIG. 8 is a diagram showing an exemplary system for processing system performance reports. Local results of various events are recorded in the system log file 20 by the logging device 13 as described above. For example, at the end of a day's events, the content of the system log file 20 is transferred to a log file 72 and processing speeds (response speeds) are calculated using the method described above. Individual data in the log file are associated and processing times are calculated by the calculation system 71 automatically. Since data format vary with the event and different events require different data to be associated, it is meaningful to handle the log files of various events collectively at a center 70 (TCC: technology command center).

The data that has been calculated is converted into a reduced file 74 by means of a reduction program 73 and uploaded to a performance reporter 75. The performance reporter 75 converts formats that vary with the event into a unified format and outputs system performance to display it in easy-to-view form, for example, by event or by machine. Performance reports are accumulated in a database 76 in such a way that they can be referenced at any time. Of course, process response times do not necessarily have to be calculated at the center 70, but they may be calculated in a local result system.

The system of this embodiment readily allows easy and high-accuracy measurement of the time required for processing even if the starting location and ending location of the processing are different. This makes it easy to measure the system performance of such a large, complex system that manipulates results of, for example, Olympic events for display.

Although the present invention has been described in concrete terms with respect to an embodiment, the present invention is not limited to the above embodiment and various modifications are possible without departing from the spirit of the invention.

For example, although the above embodiment has been described using a CIS interface and TV interface, other devices (DDS, SB, IRF, etc.) can similarly be equipped with RMSender to measure the processing times related to the given devices as with this embodiment.

Also, although the embodiment described above uses entry of timing data to signal the start of processing, any other input data may be used as well.

The start and end of processing may be signaled not only by data input from outside the system or data output from the system, but they may also be detected by RS-232C serial output, log information written into a hard disk drive (HDD), output information of various files, output of NETBIOS or other network messages, or any system event that can be monitored by a monitor program.

Figure 9:
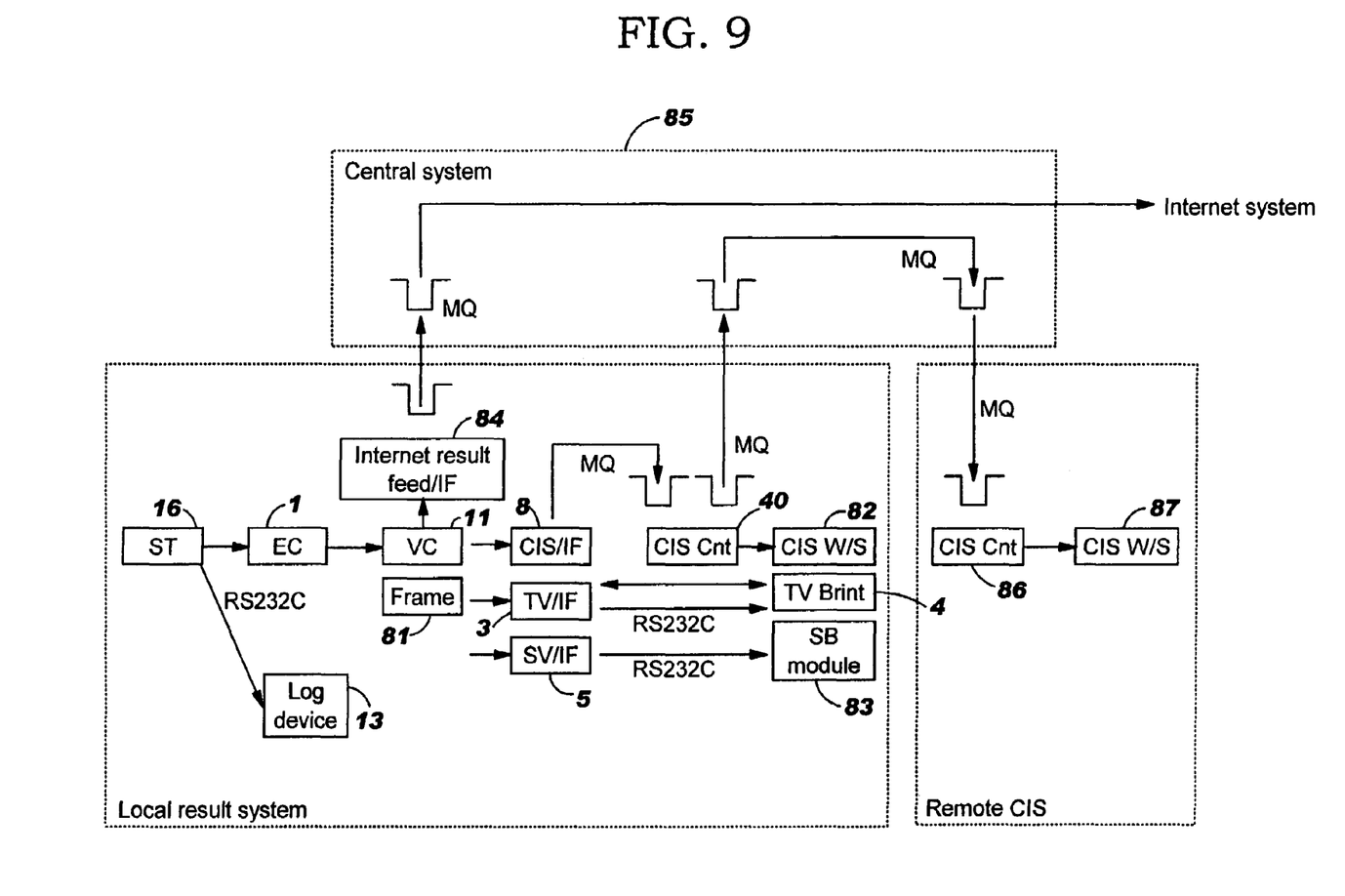
FIG. 9 is a block diagram showing another example of the data processing systems according to the present invention.

For example, a system such as the one shown in FIG. 9 can measure the time interval between the time when EC1 in the local result system receives data from the timing device 16 and the time when it writes calculation results into a frame (HDD) 81 of VC 11. Methods of detecting a write event into an HDD in real time include using a file-change event notification supplied as an API to the OS or scanning directory information of the HDD at regular intervals (e.g., every 500 msec). If an event such as a file change is detected by any of these approaches, the system can generate a packet containing details of changes (date, size, file name, etc.) and send it to the logging device 13 of the present invention via UDP or the like. To associate log data with each other, the file name, file size, etc. can be used.

Also, the system shown in FIG. 9 can measure the time required for data to reach a CIS workstation 82 from a CIS interface 8 via MQ and a CIS controller 40. Since the CIS controller 40 and CIS workstation 82 are connected by NETBIOS, NETBIOS messages can be captured. By packetizing these messages and sending them to the logging device 13 via UDP or the like, it is possible to identify times as is the case with the illustrative embodiment. Log data can be associated with each other by using the content of the messages.

Similarly, by measuring the difference between the times required for a NETBIOS message to travel from the CIS interface 8 to the CIS workstation 82 (local workstation) and from the CIS interface 8 to the CIS workstation 87 (remote workstation), it is possible to find the delay time caused by traveling via the central system. Since exactly the same message is logged through different routes, log data can be associated easily.

Figure 10:
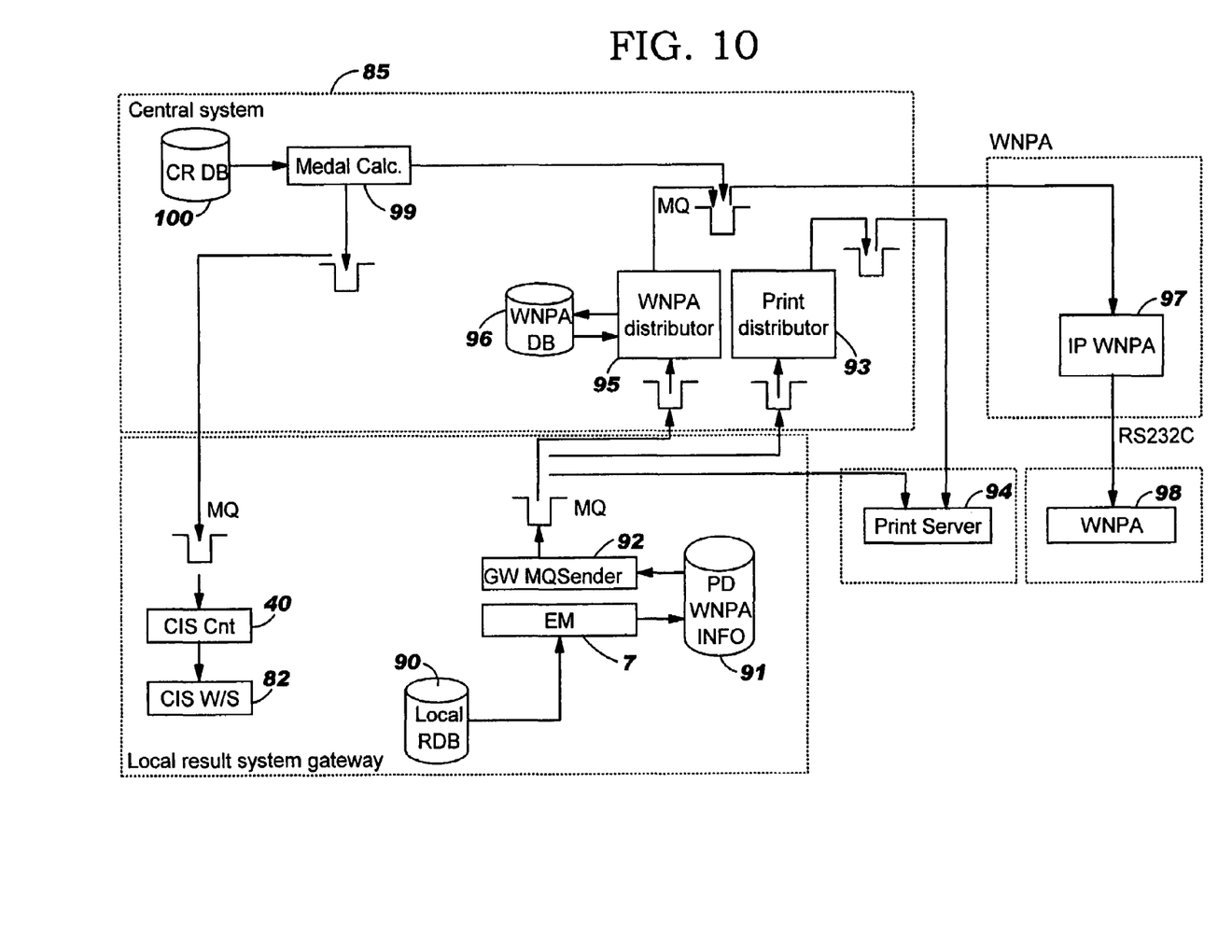
FIG. 10 is a block diagram showing still another example of the data processing systems according to the present invention.

Also, the system shown in FIG. 10 can measure the time interval that elapses between the time when a file created by the event manager (EM) 7 of the local result system is recorded in a database 91 of the WNPA (Olympic news distribution system for the press) and the time when it is recorded on an HDD 97 of a WNPA server via MQSender 92, MQ, and the central system's WNPA distributor 95 or the time when it is recorded on an HDD of a WNPA terminal 98 via RS-232C. Events (recording on HDD) are detected and log data are associated in the manner described above.

Furthermore, the system can measure the time interval required for a print file created by EM7 to be stored in a HDD of a print server 94 via a print distributor 93. In this case, the log file can be associated by using the file name and size information plus the size increase equivalent to header information size.

The above exemplary embodiment has been described taking as an example a system which displays, manipulates, edits, and controls result information of Olympic games. The larger and more complex the system, more pronounced the effect of the present invention. However, the present invention is not limited by the scale or complexity of systems. In other words, the present invention can be applied to any application or any system that measures processing times in a system where the starting location and ending location of processing are different.

We claim:

1. A method for determining the performance of a data processing system wherein a defined processing task is started by a first data processing device and finished by a second data processing device which may have separate clocks that are not synchronized, the method comprising the steps of:

by a logging device, receiving a first notification when said defined processing task is started by the first data processing device, wherein the first notification includes input data entered when processing is started by the first data processing device;

generating process start time data using a clock of the logging device, wherein the process start time data includes time of receipt by the logging device of the first notification;

by the logging device, receiving a second notification when the defined processing task is finished by the second data processing device, wherein the second notification includes at least part of the input data entered when processing is started by the first data processing device;

generating process end time data using the clock of the logging device, wherein the process end time data includes time of receipt by the logging device of the second notification; and calculating processing time for performing said defined processing task, from start to finish, by comparing the process start time data and the process end time data;

wherein, in the step of calculating, the process start time data and the process end time data are associated with each other using keywords of the input data entered when said defined processing task is started by the first data processing device.

2. The method of claim 1, wherein the first notification includes input data entered when processing is started by the first data processing data.

3. The method of claim 2, wherein the second notification includes the input data.

4. The method of claim 2, wherein the process start time data and the process end time data are associated with each other using the input data.

5. The method of claim 1, further including the step of recording the first notification on a recording medium.

6. The method of claim 1, further including the steps of:
recording the process start time data on a recording medium; and
recording the process stop time data on the recording medium.

7. The method of claim 1, wherein the first notification includes information from a second logging device.

8. The method of claim 1, wherein the first notification includes information captured from a network when processing is started by the first data processing device.

9. The method of claim 8, wherein the process start time data and the process end time data are associated with each other using the information captured from the network.

10. The method of claim 1, wherein the second notification includes information captured from a network when processing is finished by the second data processing device.

11. The method of claim 10, wherein the process start time data and the process end time data are associated with each other using the information captured from the network.

12. A method for determining the performance of a data processing system wherein processing is started by a first data processing device and finished by a second data processing device which may have separate clocks that are not synchronized, the method comprising the steps of:
by a logging device, receiving a first notification when processing is started by the first data processing device, wherein the first notification includes input data entered when processing is started by the first data processing device;
generating process start time data using a clock of the logging device, wherein the process start time data includes time of receipt by the logging device of the first notification;
by the logging device, receiving a second notification when the processing is finished by the second data processing device, wherein the second notification includes at least part of the input data entered when processing is started by the first data processing device;
generating process end time data using the clock of the logging device, wherein the process end time data includes time of receipt by the logging device of the second notification; and
calculating processing time by comparing the process start time data and the process end time data;
wherein, in the step of calculating, the process start time data and the process end time data are associated with each other using keywords of the input data entered when said defined processing procedure is started by the first data processing device; and
wherein the first notification and the second notification are transmitted using Transmission Control Protocol.

13. The method of claim 1, wherein the first notification and the second notification are transmitted using User Datagram Protocol.

14. A data processing system comprising:
a first data processing device that starts a defined processing task;
a second data processing device for finishing said processing task; and
a logging device; wherein the logging device comprises:
logic for receiving a first notification including input data when said defined processing task is started by the first data processing device;
logic for generating process start time data using a clock of the logging device, wherein the process start time data includes time of receipt by the logging device of the first notification;
logic for receiving a second notification including at least part of the input data when said defined processing task is finished by the second data processing device;
logic for generating process end time data using the clock of the logging device, wherein the process end time data includes time of receipt by the logging device of the second notification; and
logic for associating the process start time data and the process end time data with each other using keywords of the input data, and calculating processing time for performing said defined processing task, from start to finish, by comparing the process start time data and the process end time data.

15. The data processing system of claim 14, wherein the logging device further includes logic for calculating processing time by comparing the process start time data and the process end time data.

16. A data logging system, comprising:
logic for receiving a first notification including input data when a defined processing task is started by a first data processing device;
logic for generating process start time data using a clock of the logging system, wherein the process start time data includes time of receipt by the logging device of the first notification;
logic for receiving a second notification including at least part of the input data when said defined processing task is finished by a second data processing device;
logic for generating process end time data using the clock of the logging system, wherein the process end time data includes time of receipt by the logging system of the second notification; and
logic for associating the process start time data and the process end time data with each other using keywords of the input data, and calculating processing time for performing said defined processing task, from start to finish, by comparing the process start time data and the process end time data.

17. Programmable media containing programmable software for measuring the performance of a data processing system wherein a defined processing task is started by a first data processing device and finished by a second data processing device which may have separate clocks that are not synchronized, the programmable software comprising the steps of:
receiving a first notification when said defined processing task is started by the first data processing device, wherein the first notification includes input data entered when processing is started by the first data processing device;

generating process start time data using a logging clock, wherein the process start time data includes time of receipt of the first notification;

receiving a second notification when the defined processing task is finished by the second data processing device, wherein the second notification includes at least part of the input data entered when processing is started by the first data processing device;

generating process end time data using the logging clock, wherein the process end time data includes time of receipt of the second notification; and calculating processing time for performing said defined processing task, from start to finish, by comparing the process start time data and the process end time data;

wherein, in the step of calculating, the process start time data and the process end time data are associated with each other using keywords of the input data entered when processing is started by the first data processing device.

* * * * *